Sept. 17, 1957 M. LANG 2,806,577
AUTOMATIC TWO-WAY TRANSFER
Filed Jan. 25, 1954 2 Sheets-Sheet 1
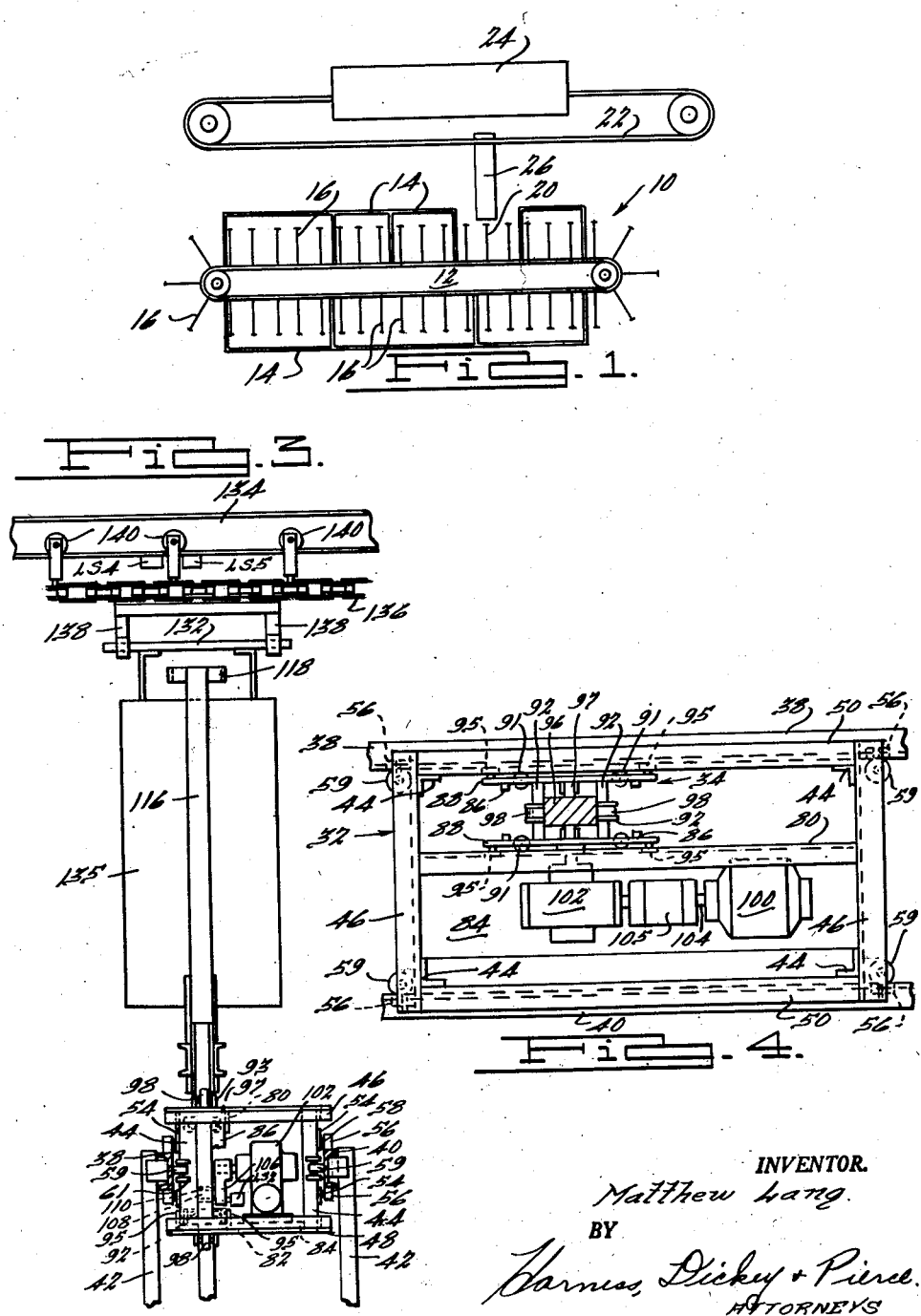
INVENTOR.
Matthew Lang.
BY
Harness, Dickey & Pierce.
ATTORNEYS.

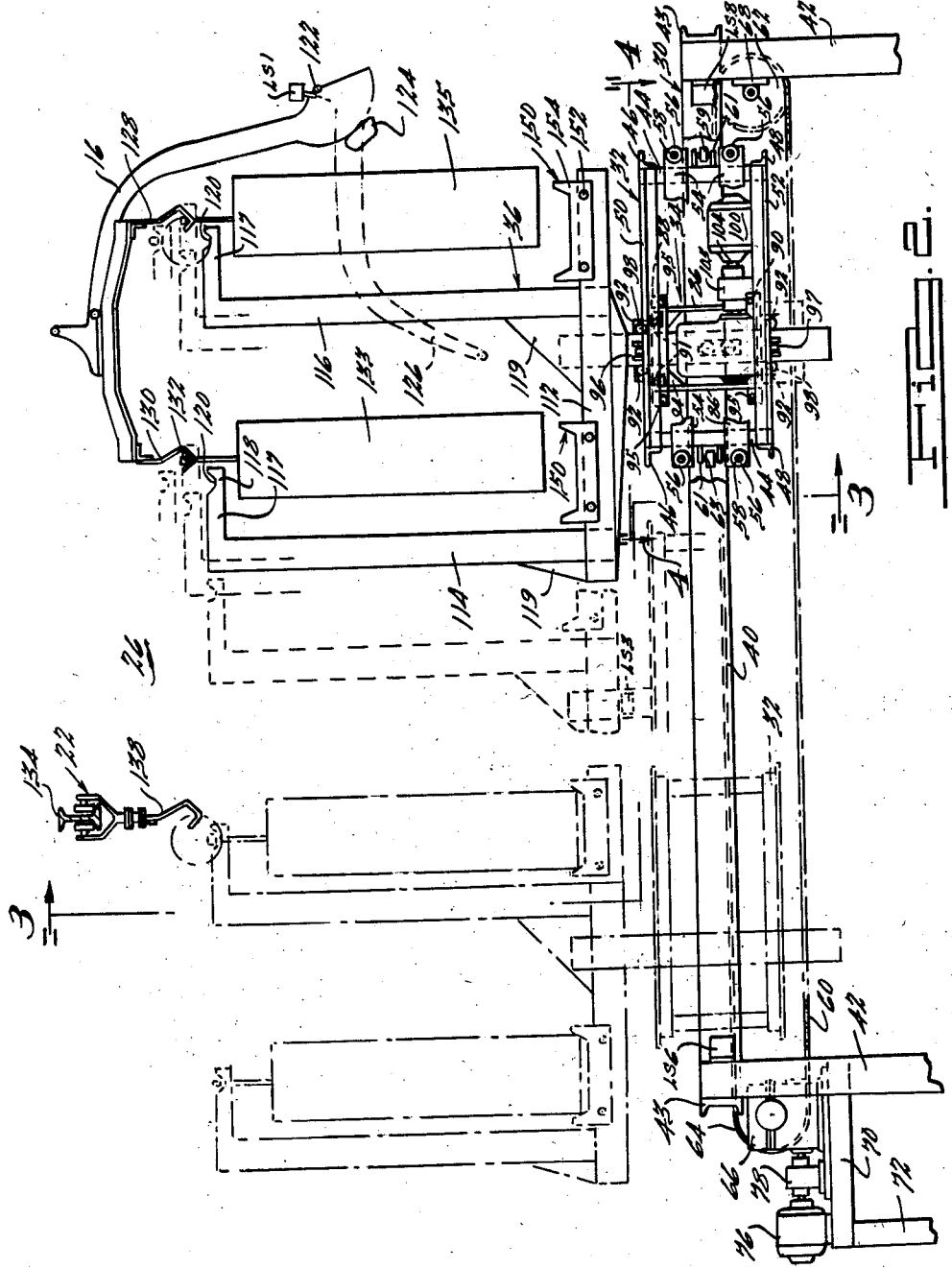

United States Patent Office 2,806,577
Patented Sept. 17, 1957

2,806,577

AUTOMATIC TWO-WAY TRANSFER

Matthew Lang, Detroit, Mich., assignor to Frederic B. Stevens, Inc., Detroit, Mich., a corporation of Michigan Application January 25, 1954, Serial No. 405,938

12 Claims. (Cl. 198—20)

The present invention relates to material conveyors and more particularly to a mechanism for automatically transferring materials between material carriers or the like.

Generally, the overhead conveyor system has greatly expedited the flow of material between various units and sections in industrial plants. Although the conveyor lines of such systems have generally required manual or semi-automatic loading and unloading at their terminals, the disadvantages arising therefrom have usually been overlooked in view of the other advantages of the system. However, recent developments made in the automation of machine tools and processes has rendered the arrangement heretofore in use, in which the material was manually or semi-automatically transferred between conveyor systems or between a production unit and a conveyor system, inadequate and impractical to keep pace with the volume of material now being handled. To accommodate the transfer of such large volumes of material, quickly and efficiently, between such systems and units, it is now necessary to transfer the material automatically.

In accordance with the teachings of the instant invention, a novel transfer mechanism is provided which is adapted to be interposed between different conveyor systems or between a production unit and a conveyor system for automatically removing material from one carrier, transporting it to another carrier and depositing it thereon, the arrangement being such that the mechanism may be coordinated with the timing cycle of the respective carrier apparatus for continuously transferring material therebetween without interfering with the normal operation of the apparatus.

Accordingly, one object of the present invention is the provision of a novel transfer mechanism for automatically transferring materials between material carriers.

Another object of the present invention is the provision of transfer mechanism which is adapted to automatically transfer material between carriers on a single line system and carriers on a multiple line system, between multiple line carrier systems, or between any combination or variation of such systems.

A further object of the present invention is the provision of a transfer mechanism which operates to transfer material smoothly, quickly and efficiently between carrier apparatus.

Still another object of the present invention is the provision of a material transfer mechanism which is readily adaptable to operate in conjunction with the timing cycle of operating apparatus for transferring material to and from the apparatus without interfering with the normal operation thereof.

A still further object of the present invention is the provision of an automatic transfer mechanism which is simple in construction, economical to manufacture and dependable in operation.

Other objects and features of the invention will become apparent to those skilled in the art as the disclosure is made in the following detailed description of a preferred embodiment of the invention as illustrated in the accompanying sheets of drawings in which:

Figure 1 is a plan view, in simplified form, of a typical automatic processing machine and system having the instant invention incorporated therein;

Fig. 2 is a front elevational view of the transfer mechanism, comprising the preferred embodiment of the invention, and showing the carrier arms in various material transferring positions;

Fig. 3 is a side elevational view, taken substantially on the line A—A of Fig. 2 and looking in the direction of the arrows, showing the raising mechanism for the carrier arms; and Fig. 4 is a plan view, taken substantially on the line B—B of Fig. 2 and looking in the direction of the arrows, showing the guiding arrangement of the column carriage.

For convenience of explanation, the transfer mechanism is illustrated as operating to transfer material from an electroplating machine, having a pair of racks or hangers suspended thereon and which are to be transferred to a single line conveyor system. However, it is to be understood that the transfer mechanism should not be limited to this specific use but may be used to transfer materials between a storage bank and a conveyor system, between conveyor systems themselves, between conveyor systems and production units or in any situation where materials are to be transferred automatically. Moreover, the transfer mechanism may be utilized to transfer material between carriers on a single line system and carriers on a multiple line system, as described herein, or between multiple line carrier systems, or between any combination or variation of such systems; all of which will be readily apparent to one skilled in the art. It will be noted that the term "transfer" as defined and used herein means the removing, conveying and depositing of material between one or more material carriers as distinguished from a conveyor system which serves primarily as a material conveying means between a point of origin and a point of destination.

Referring more particularly to the drawings, wherein like reference characters designate like or corresponding parts throughout the several views, there is shown in Figure 1, an automatic electroplating machine 10 having a centrally located drive and support mechanism 12 and a plurality of processing tanks 14 positioned on both sides of mechanism 12. Secured around the periphery of the drive mechanism in spaced relation to each other and overhanging the tanks 14 are a plurality of cammed arms 16 adapted to support the material to be electroplated. The arms 16 are driven simultaneously by the mechanism in an elliptical path around the mechanism by intermittent discrete steps whereby the arms are advanced in unison a predetermined amount upon each movement of the mechanism. The cycle of operation of the mechanism is so timed that after stopping, the arms remain stationary at that station or point for a set period of time, usually approximately 30 seconds. During this rest period, the material to be electroplated is lowered in a tank for processing. Since the complete processing of an article to be electroplated requires several steps, such as pickling of the article in a suitable solution, washing the article, etc., several tanks are used. In the event that the particular step requires a period of time greater than the usual rest cycle of the drive mechanism for proper processing thereof, the arms remain in the same tank for several cycles as in the extreme lower left tank of Figure 1 wherein three complete rest cycles are used.

Interposed between the electroplating machine 10 and a conveyor line 22, which functions to carry the processed articles to a suitable machine 24 for finishing, is the transfer mechanism 26 embodying features of the present invention. The transfer mechanism serves to remove carried material from arms 16, in an unload station 20, convey the removed material to the conveyor line 22 and deposit it thereon. Since the arms 16 remain stationary for only a relatively short period of time, which in this instance approximates 30 seconds, the entire transfer operation must be completed and the transfer mechanism returned to the machine 10 during the rest period to prevent a disruption in operation of the automatic processing machine 10.

As best shown in Figs. 2 and 3, this transfer mechanism comprises a supporting base and guideway 30, a driven transfer carriage 32 movably mounted on the guideway, a supporting column carriage 34 carried within the transfer carriage 32 and a column carrier 36 supported and driven from the carriages 32 and 34. In a manner which will shortly become apparent, the transfer mechanism operates automatically to drive the column carrier through a circular motion for picking up material to be transferred from arm 16, move the transfer carriage 32 on guideway 30 for carrying material to conveyor 22, depositing the material thereon, and return the carriage 32 to the unload station of mechanism 10 for repeating the cycle.

The entire transfer mechanism is supported by the supporting base and guideway generally designated 30 which comprises a pair of laterally extending, parallel channels or guideways 38 and 40 and a plurality of supporting standards 42 firmly secured at their lower ends to a base or floor (not shown) and at their upper ends to the guideways 38 and 40. Preferably, a supporting standard 42 is provided at each end of a guideway and secured to the outer side of the guideway by welding or the like, with the respective left and right end standards 42 being secured together and to the guideways by short, transversely disposed reinforcement braces 43. If desired, additional standards and reinforcements may be provided at intermediate points on the guideways to insure a sufficiently rigid and stable support for the mechanism.

Each of the guideways 38 and 40 comprises a suitable U-shaped channel iron which is secured to standards 42 with its legs, defined by the outer ends of a channel iron, extending outwardly to provide a track and guideway for transfer carriage 32 which is carried thereon. The transfer carriage 32 is positioned between the guideways 38 and 40 and operative to move laterally thereon. Preferably, the transfer carriage is formed as a rectangular box-shaped frame having a plurality of upstanding vertical frame legs 44 defining the side corners of the frame. Each of the frame legs are interconnected with each other at their upper and lower ends by parallel pairs of laterally and transversely disposed reinforcement braces 46, 50 and 48, 52, respectively, which are suitably secured to the legs and to each other for forming the top and bottom edges of the frame. Secured on the legs 44, on the outward sides of carriage frame 32, and spaced intermediate the top and bottom edges thereof, are a pair of parallel guide bars 54 (Fig. 2).

Each of the guide bars is provided with a vertically disposed, outward extending transfer carriage guide roller 56 on its extreme ends. The rollers are rotatably mounted on guide bars 54 by pins 58 secured to a side of the bars and positioned above and below the guideways 38 and 40. As best shown in Fig. 2, the rollers mounted on the upper guide bars 54, on each side of the carriage frame, are adapted to engage the upper legs of guideways 38 and 40, while the rollers mounted on the lower guide bars 54 are adapted to engage the lower legs of the guideways. As such, the rollers serve to support the transfer carriage 32 on the guideways and permit lateral movement of the carriage thereon while preventing vertical movement thereof. In order to prevent transverse movement of the carriage frame relative to the guideways 38 and 40, a horizontally disposed, transverse guide roller 59 is provided on each frame leg 44, between the guide bars 54, for engaging the inner or base side of the U-shaped guideways. Rollers 59 are secured to each leg by a pair of laterally extended ears 61 having a vertically extended roller shaft 62 journaled therein which carries the rollers 59.

Lateral movement is imparted to the transfer carriage by a motor driven gearing chain 60 trained around a guiding, idle gear sprocket 62 mounted on the right standards 42 and a drive sprocket 64 suitably supported by a gear reducer mechanism 66. Idle sprocket 62 is positioned between the standards 42 on a transverse bar member 68 having a transverse idle shaft journaled in a pair of bearings on each end thereof which carries the sprocket 62. The ends of the gearing chain 60 are each securely fastened to the opposite ends of the transfer carriage frame. Preferably, the sprockets are mounted such that the gearing chain, connected to the carriage frame, falls along a straight line passing approximately equally between the top and bottom portions of the carriage frame for providing an equalized lateral driving force on the member.

Suitably mounted on a transfer drive platform 70 supported on the left upright standards 42 and a pair of platform support standards 72 is the driving mechanism for the gearing chain. The driving mechanism comprises a suitable gear reducer 66 positioned adjacent to the standards 42 and a reversible drive means 76. The drive sprocket 64 is keyed or otherwise appropriately fixed for rotation on the output shaft of the gear reducer in aligned relation with the drive sprocket 62 and is driven through the gear reducer 66 by the reversible drive means 76, which may comprise a suitable electric motor. The output shaft of the motor is connected directly to the gear reducer by a suitable shaft connector carried in a support bearing 78.

As described thus far, it will be apparent that energization of the motor 76 will drive the gearing chain 60, through the gear reducer 76, around the sprockets 62 and 64. Movement of the chain, which is connected to the transfer carriage 32, will exert a driving force on the transfer carriage whereby the carriage will move along the guideways on its supporting guide rollers 56 and 59. Depending on the direction of rotation of the motor 76 and the duration of operation thereof, the carriage may be moved to any point on the guideways 38 and 40.

The supporting column carriage 34, which functions to guide column carrier 36 through a circular motion and provide a stabilizing support for the vertically extended column carrier, is carried within transfer carriage 32 and is mounted for reciprocating lateral movement therein. To accommodate the column carriage and the column driving mechanism, the transfer carriage frame 32 is provided with a pair of laterally extending, parallel track bars 80 and 82 (Fig. 3) secured to the transverse braces 46 and 48, respectively, at approximately the center of the frame. Also, rigidly fastened on the transverse braces 48, between the track bar 82 and a reinforcement brace 52 is a column drive platform 84 adapted to support the column driving mechanism.

Column carriage 34, like the transfer carriage 32, preferably comprises a box-shaped frame having four upright, corner defining legs 86, having parallel pairs of laterally disposed braces 88 and 90, respectively, connected at the upper and lower ends of the legs. Each pair of braces 88 and 90 is in turn connected together by a pair of transversely disposed guide braces 92, which are positioned inwardly from the legs 86 and above and below the braces 88 and 90, respectively, for a purpose hereinafter stated. If desired, each of the braces and legs may be further reinforced for rigidity by a plurality of braces as indicated at 94 in Fig. 2. Rotatably mounted on pins attached to the outer ends of each lateral brace 88 and 90 is a vertically disposed, lateral motion guiding roller 95. The rollers 95 are mounted such that the rollers on respective parallel braces 88 are operative to engage the lower edge surfaces of track bar 80 and top brace 50 while the rollers on respective parallel braces 90 are operative to engage the upper edges of track bar 82 and lower brace 52. If desired, additional, horizontally disposed rollers as indicated at 91 may be provided on the outward sides of braces 88 and 90 to engage the inner sides of track bars 80 and 82 and braces 52 and 50 for preventing transverse movement of the column carriage 34. It is apparent from this description that the column carriage 34 is supported and permitted free lateral movement on the transfer carriage 32.

Vertically guided within the column carriage 34 is a material column carrier 36. The column carrier preferably includes, at its lower end, a unitary elongated mainstay 96, of rectangular cross-sectional area, which is adapted to pass vertically, through the box-shaped frames of the transfer and column carriages. The transversely disposed guide braces 92 of the carriage 34 are mounted on lateral braces 88 and 90 of the column carrier in juxtaposed relation to the mainstay with each guide brace having a vertically disposed column guide roller 98 thereon. The column guide rollers 98 are positioned on the top portion of the upper guide braces 92 and on the lower side of the lower guide braces 92 by suitable ears 93 (Fig. 3) such that the rollers engage the edge portions of the mainstay for guiding column carrier 36 in a vertical direction and for providing a stabilizing support for the column carrier. Although the column rollers are illustrated as being vertically positioned adjacent to the top and bottom portions of column carriage 34, it is contemplated that vertically disposed braces may be secured to the column carriage 32 for increasing the distance between the rollers 98 should the column carriage require further vertical stabilizing. A second set of guiding and stabilizing rollers 97 are suitably mounted on the laterally disposed braces 88 and 90. Rollers 97 which are vertically disposed on braces 88 and 90, engage the opposite sides of the column carrier for preventing transverse movement of the column carrier and for stabilizing and guiding the vertical movement of carrier 36.

The drive mechanism for the column carrier 36 is mounted on the platform 84 which, as indicated herebefore, is itself rigidly supported on reinforcement braces 48 of transfer carriage 32 and comprises a suitable reversible column drive motor 100, such as a reversible electric motor or the like, and a gear reducer 102 connected to the motor by a shaft connector 104 mounted in a support bearing 105. The motor and gear reducer are mounted on the platform such that the output shaft of gear reducer 102 is arranged normal to the body of the mainstay 96. This column drive mechanism acts to drive the column carrier through a circular motion and due to the guiding function of the column carriage, reciprocates the column carriage in the transfer carriage by means of an eccentric column drive (Fig. 3). The column drive includes a crank-arm 106 keyed or otherwise fixed to the output shaft of the gear reducer for rotation therewith, and a horizontal crank-pin 108 disposed parallel to the gear reducer output shaft on the outer end of the crank-arm. The crank-arm and pin are drivingly connected to the mainstay 96 of the column carrier by the pin 108 which is received in a bearing aperture 110 formed in the mainstay.

The column carriage and column drive mechanism are coordinated in their operation as follows: When the column drive motor 100 is suitably energized, the crank-arm 106 will be rotated through the gear reducer to effectuate a movement of the column carrier mainstay 96. Upon initial movement of the crank-arm 106, for example a counterclockwise movement as seen in Fig. 2, the mainstay of the column will be moved upwardly by crank-pin 108 between guide rollers 97 and 98 on guide bars 92 and braces 88 and 90 while the column carriage 34 will move to the right in transfer carriage 32 by means of column rollers 95. This action will continue until a 90° movement of the crank-arm has been completed and at which point, the carrier will have moved upward and the column carriage to the right an amount equal to a crank-arm length. As the crank continues to rotate counterclockwise, the carriage will now reverse its direction and move to the left while the column continues its upward movement, until the crank-arm has moved a total of 180° of its travel. At this point, the column carrier will have moved in the vertical direction an amount equal to two crank-arm lengths and the column carriage will be back in its center position. Continued counterclockwise movement of the crank-arm will drive the column carrier 36 downward and the column carriage to the left of its center position. This continues until the crank-arm completes 360° of travel, whereupon the column carrier and carriage are returned to the normal position. Thus, with each complete rotation of the crank-arm, the mainstay 96 and the column carrier will move in a complete circular path and the column carriage will reciprocate in a lateral path.

The material to be transferred by the transfer mechanism is supported by column carrier 36 having a horizontal crossbeam 112 rigidly secured to the upper end of mainstay 96 and one or more vertically extended, spaced carrier arms 114 and 116 rigidly attached to the crossbeam. In the illustrated embodiment, the carrier arms are secured to the mainstay by suitable braces 119 and with carrier arm 114 being secured to the outer left end of the crossbeam and carrier arm 116 being secured inwardly of the right end of crossbeam 112. Preferably the crossbeam is secured to the mainstay 96 at a point such that the column carrier will be substantially balanced about the mainstay when each of the carrier arms is carrying a load of material. Each of the carrier arms includes a vertically extended leg member and an integral, overhanging supporting arm 117 having a broadened end portion 118 (Fig. 3) adapted to suspend a load of material thereon. To insure that the load will be carried at the same point on the supporting arm at all times, a centering groove 120 is formed on the upper surface of each supporting arm. It will be apparent that as the mainstay is moved by the eccentric drive through a circular motion, the carrier arms 114 and 116 will be similarly moved to rotate supporting arms 117 thereof in a circular motion.

As indicated above, the transfer mechanism in this instance is depicted as transferring material from an electro-plating machine 10 to a conveyor line 22. Conventionally, the cammed arms 16 of the machine are pivoted about an axis 122 by a cam member 124 for pivoting the arm 16 between a lowered processing position 126 to a raised load or unload position. Attached on the inner and outer ends of arms 16 are a pair of spaced supports or hooks 128 and 130 adapted to carry, in a suspended manner, the material to be electroplated. Each of the arms 128 and 130 comprise a pair of parallel, spaced hooks or supports and suspend the carried material therebetween by a support rod 132 attached to a portable carrier of materials, such as for example, a rack or hanger 133 and 135. The rack, in turn, suitably carries the workpieces or articles to be processed. As will hereinafter be explained in the operation, the enlarged end portions 118 of the carrier arms 114 and 116 are adapted to be moved in a circular motion for approaching the support bars 132 from beneath, between the parallel hooks of supports 128 and 130, lifting them up for removing the racks from machine arms 16, and transferring them to a conveyor system.

Inasmuch as the material is carried on racks which are suspended from hooks positioned above the material, the racks tend to swing or oscillate about the support bar 32 whenever the column carrier is quickly moved or stopped suddenly. Although the swing will be slight and may be neglected with most loads, the swing may become pronounced should a low, heavy load be carried on the racks. In order to limit the swing in such cases stop members 150 may be attached to crossbeam 112 by screws 152 or the like, beneath the supporting arms 117. Stop members 150 are provided with an abutment 154 on each end thereof which are adapted to be engaged by a material carrying rack. Abutments 154 each have an outwardly inclined edge surface to provide clearance for racks 133 and 135 when they are being loaded or unloaded from the column carrier and during which operation, the racks are moved in a circular path.

The conveyor system 22 is conventional and includes an overhead guide beam 134, a drive gear chain 136, and a plurality of driven hooks or supports 138, as best shown in Fig. 3, carried on the guide beam 134 by guide rollers 140. It will be noted that the conveyor hooks 138 are similar in construction with the supports or hooks 128 and 130 in that each hook 138 comprises a pair of spaced hook members (Fig. 3) adapted to receive and carry material suspended therebetween on a support bar. It is contemplated, however, that the hooks may be of various types and shapes, with the type of hook used being determined by the particular application of the transfer mechanism and the material to be carried.

Since the transfer mechanism is to be operated in conjunction with different systems, and must thus function to transfer material in accordance with the associated systems, a plurality of control devices in the form of limit switches are provided on the transfer mechanism. The position and function of each of such control means will be described with relation to the operation hereinafter given. Inasmuch as any conventional electrical circuit may be used to tie-in the various components and control means together, and such circuits are well known in the art, it is not believed necessary to include the electrical circuit diagram for a complete understanding of the instant invention.

Operation

Assuming that the transfer mechanism is in a rest position in the extreme right position as shown in Fig. 2, the mechanism is to transfer material from the machine 10 to the conveying line 22 and machine 10 is operating with two material racks on each arm; then, the overall operation of the transfer mechanism is as follows: Upon completing the processing of the article in the last station, machine 10 is actuated to bring a loaded arm 16 into the unload station 20, under the control of the mechanism 12. When the arm reaches its position in unload station 20, it triggers the actuating arm of a limit switch LS 1, which energizes the column drive motor 100 for rotating the crank-arm 106. The rotating crank-arm drives mainstay 96 and hence, the column carrier, by the crank-pin in a counterclockwise circular motion, whereby the mainstay begins to move upward and to the right in a circular path and the column carriage, due to its column carrier guiding action, moves directly to the right in the transfer carriage. This movement carries the supporting arms 117, having the groove 120, beneath the support bar 132 of the material racks 133 and 135. Continued rotation of the crank-arm to 90° of its cycle moves the groove 120 into engagement with the bar 132 and the column carriage to its extreme right position. As the crank-arm continues to rotate, the carrier arm is raised further and begins to move inwardly whence its guiding column carriage has reversed its direction and is returning to its central normal position. After passing 180° of movement, the crank-arm now drives the carriers downwardly back to its original position. Upon completion of a 360° cycle, by the crank-arm, the carrier is back in its rest position carrying the material, suspended on rod 132, on the carrier arms, the column carriage is back in its center position and the unloading operation of the transfer mechanism is completed. It will be noted from this operation that racks 133 and 135 were removed simultaneously from the cammed arm 16.

When reaching the end of one revolution, the crank-arm actuates a limit switch LS 2 (Fig. 3) which de-energizes the column motor 100 for stopping the crank-arm and energizes the transfer carriage motor 76 for starting the movement of transfer carriage 32. The carriage, pulled by the gear chain 60 and guided by the rollers 56 and 59, moves towards the left end of the guideways until the mainstay 96 engages a trigger on limit switch LS 3 (Fig. 2) for actuating it. Limit switch LS 3 de-energizes motor 78 and stops the transfer carriage. Also, the actuation of limit switch LS 3 prepares the circuit for limit switch LS 4 positioned on the conveyor line 22. Limit switch LS 3 is positioned such that when the motor 76 is stopped, the groove 120 on the carrier arm 114 is in an unloading position relative to a hook 138 on the conveyor line. If no unloaded hook 138 is in a receiving position at that moment, the mechanism remains stationary. When an unloaded hook 138 is moved into position by the conveyor line, the limit switch LS 4, which had previously been prepared by the presence of the transfer mechanism, is actuated by a suitable member on the conveyor line to energize the column motor 100 in a reverse direction from its first loading position. This rotation of the motor causes a clockwise circular motion of the column carrier for lifting the material racks, carried on its supporting arms, up to the hooks 138 and depositing the racks thereon. The unloading operation of the transfer mechanism operates similarly to the loading operation with the exception of a reversed column motor direction and hence, clockwise cycling of the column carriage.

After the racks have been transferred from carrier arm 114 to the conveyor hook 138, the returning crank-arm actuates limit switch LS 2 for de-energizing column motor 100 and attempts to energize the transfer carriage motor 76. However, a limit switch LS 5 on the conveyor line 22 holds the motor inoperative until the conveyor line has moved the loaded hook 138 to an advanced position on the conveyor line. After the conveyor line has moved, limit switch LS 5 is actuated by the conveyor line apparatus to start transfer motor 76, whereby the transfer mechanism, controlled by motor 76, moves to the extreme left position and engages a limit switch LS 6 which de-energizes transfer motor 76 and stops the mechanism. In this position, the transfer mechanism has moved carrier arm 116 into an unloading position with the conveyor line 22. Limit switch LS 6, besides disengaging motor 76, acts to prepare limit switch LS 4, similarly to limit switch LS 3, and a limit switch LS 7 on the motor 76.

Should an unloaded hook be present at the transfer mechanism, limit switch LS 4 energizes the column motor 100 as soon as the transfer carriage engages limit switch LS 6, which operates in a clockwise direction to unload the material rack from carrier arm 116 onto the hook of the conveyor line. Again, the crank-arm 106 actuates limit switch LS 2 upon completing a 360° cycle whereby limit switch LS 2 de-energizes column motor 100 and attempts to start the transfer motor 76 but as before, is prevented by limit switch LS 5. The latter switch, which is operated upon the advancing of the conveyor line, actuates the transfer drive motor 76. However, a limit switch LS 7, controlled jointly by limit switches LS 6 and LS 5 is actuated to reverse the direction of the transfer motor 76 whereby the transfer carriage, carrying the empty carrier arms, is moved back to its original position on the right end of the guideway. This movement overrides one-way limit switch LS 3 and continues until limit switch LS 8 on the extreme right end of the guideway is engaged by the carriage. Actuation of this switch de-energizes the motor 76 and the transfer mechanism is now in position for loading by the machine 10 which then repeats the transfer cycle. This automatic operation continues until the mechanism is purposely stopped.

Attention is directed to the fact that the transfer mechanism is stopped in mid-track to unload carrier arm 114 instead of moving completely to the left for unloading carrier arm 116 first. The unloading of arm 114 prior to arm 116 is a matter of discretion but, in this instance, by unloading arm 114 first, a short period of time is conserved since the carrier arm would otherwise have to move to the extreme left end before unloading its first arm. The short added distance is thus used to aid the conveyor line to advance an unloaded hook while the transfer mechanism is moving into position for the unloading of the second arm. Since, as indicated heretofore, machine 10 advances the cammed arms 16 simultaneously and then stops for a rest period of approximately 30 seconds, the entire transfer operation must be completed within that period of time for the proper operation of the machine 10. The unloading of arm 114 first allows the unit to operate within this period of time. Of course, if time is unlimited, either manner of operation may be utilized.

It will be apparent that although the transfer mechanism is disclosed as transferring the load from a double carrier machine to a single carrier conveyor line, that the transfer operation may be reversed and the material carried from the conveyor line to the machine. Moreover, the carriers may have a single or a multiple number of carrier arms and the loading and unloading of the carrier arms may be done individually or in various combinations. As an example, the carrier may have four carrier arms and the transfer mechanism may load each arm individually but unload them simultaneously on a four line carrier system, or the like.

While it will be apparent that the preferred embodiment of the invention herein disclosed is well calculated to fulfill the objects above stated, it will be appreciated that the invention is susceptible to various modifications, variations, and changes without departing from the proper scope or fair meaning of the subjoined claims.

What is claimed is:

1. In a mechanism for transferring material between spaced material carriers, guided means operative to move between said material carriers and into juxtaposed relation to each of said material carriers, carrier means movably supported on said guided means and including arm means positionable adjacent said material carrier, drive means carried on said guided means and operatively connected to said carrier means for driving the carrier means relative to said guided means through a circular motion in a vertical plane, to thereby transpose material between the carrier means and a material carrier upon operation of said drive means.

2. In a mechanism for transferring material between spaced material carriers having supports for suspending material therefrom, guided means operative to move between said material carriers and into juxtaposed relation with each of said material carriers, and a carrier means movably supported on said guided means, said carrier means including upstanding arm portions for supporting material thereon, said arm portions being positionable adjacent said material carrier supports, and drive means on said guided means operatively connected to said carrier means, said drive means including eccentric means for raising the carrier arm portions relative to the guided means in a circular path in a vertical plane and into material transposing position with a material carrier support upon operation of said drive means.

3. In a mechanism for transferring material between spaced material carriers having supports for suspending material therefrom, guided means operative to move between said material carriers and into juxtaposed relation with each of said material carriers, vertically extended carrier means movably supported on said guided means and having arm means for supporting material adjacent said material carrier supports, drive means carried on said guided means, said drive means being operatively connected to said carrier means and including eccentric means for driving said carrier means through a circular motion in a vertical plane, said arm means moving into material transposing relation with a material carrier support upon operation of said drive means, and lateral translation means for said guided means, said translation means being operative to move said guided means to the other of said material carriers for transposing material between the carrier arms and said other material carrier.

4. In a mechanism for transferring material between spaced material carriers having supports for suspending material therefrom, guided means operative to move between said material carriers and into juxtaposed relation with each of said material carriers, carriage means carried in said guided means and movable relative thereto, a column carrier movably supported in said guided means and being guided and stabilized by said carriage means, said column carrier having upstanding arm portions positionable by said guided means adjacent said material carrier supports, and an eccentric drive means carried on said guided means, said eccentric drive means being operatively connected to said column carrier for simultaneously imparting horizontal and vertical motion to said column carrier in a vertical plane, said carriage means being reciprocated in the guided means and said column carrier being operative to move the carrier arm portions into material transposing relation with a material carrier support upon operation of the eccentric drive means, and lateral translation means operatively connected to said guided means for moving the guided means between said material carriers.

5. A material transferring mechanism including a first material carrier having at least one support for suspending material therefrom, a second material carrier spaced from said first material carrier and having at least one support for suspending material therefrom, a guideway interposed between said material carriers, a transfer carriage carried on said guideway and adapted to move thereon between the material carriers, a column carriage on said transfer carriage for movement therewith and having means for providing lateral movement in the transfer carriage, a vertically extended column carrier movably supported on said transfer carriage and in said column carriage, said column carrier including arm means disposed on the upper end thereof for supporting material thereon and positionable adjacent said supports of the first and second material carriers by said transfer carriage, eccentric drive means mounted on said transfer carriage and operatively connected to said column carrier for simultaneously imparting horizontal and vertical motion to said column carrier in a vertical plane, said column carriage being reciprocated in the transfer carriage and said arm means being moved into material transposing relation with a material carrier support of the first material carrier upon operation of the eccentric drive means, and transfer drive means operatively connected to the transfer carriage for moving the arm means to the second material carrier for transposing material between the arm means and a support of the second material carrier.

6. In a mechanism for transferring material between spaced material carriers having supports for suspending material therefrom, a supporting guideway extending between said material carriers, a transfer carriage movably carried on said guideway, a column carriage carried on said transfer carriage and having means for lateral movement therein, an upstanding column carrier movably supported on said transfer carriage and in said column carriage, said column carriage being vertically guided and stabilized in its movement by said column carriage and having at least one carrier arm on its upper end for suspending material therefrom, said carrier arm being positionable by said column carriage adjacent said material carrier supports, and an eccentric drive means on the transfer carriage, said drive means being operatively connected to said column carrier for simultaneously imparting horizontal and vertical motion to said column carrier in a vertical plane such that the guiding column carriage is reciprocated in the transfer carriage and the column carrier including the carrier arm is driven about a material carrier support for transporting material between said material carrier support and the carrier arm.

7. In a mechanism for transferring material between spaced material carriers having supports for suspending material therefrom, a supported guideway extending between said material carriers, a transfer carriage movably carried on said guideway, a column carriage carried on said transfer carriage, said column carriage having means for relative movement therein, an upstanding column carrier movably supported on said transfer carriage and in said column carriage, said column carriage having means for vertically guiding and stabilizing said column carrier therein, at least one carrier arm supported on the upper portion of the upstanding column carrier and operative to suspend material therefrom, said carrier arm being positionable adjacent said material carrier supports by said column carrier, and eccentric drive means operatively connected to said column carrier, said drive means including a crank-arm and a crank-pin for driving said column carrier through a circular motion such that operation of the drive means and movement of the crank-arm serves to reciprocate the guiding column carriage in the transfer carriage and drive the carrier arm about said material carrier supports for transposing suspended material between the carrier arm and the material carrier supports.

8. In a mechanism for transferring material, the combination of a pair of spaced material carriers each of which has supports for suspending material therefrom, a guideway extending between said material carriers, a transfer carriage carried on said guideway, means for moving said transfer carriage on said guideway between said material carriers, a column carriage carried in said transfer carriage for movement therewith and having means for relative movement therein, a column carrier including a vertically extended mainstay movably supported on said transfer carriage and in said column carriage, said column carriage having means for vertically guiding and stabilizing said column carrier therein, said column carrier including a laterally disposed crossbeam secured on the upper portion of said mainstay with a plurality of vertically extended carrier arms supported intermediate the ends of said crossbeam, each of said carrier arms being positionable adjacent a material carrier support by said transfer carriage and operative to have material suspended therefrom, and drive means operatively connected to said column carrier, said drive means including a crank-arm and a crank-pin for simultaneously imparting a horizontal and vertical motion to said column carrier in a vertical plane such that operation of the drive means and movement of the crank-arm serves to reciprocate the guiding column carriage in the transfer carriage and drive the carrier arms about said material carrier supports, said carrier arms being moved into the plane of the material carrier supports for transposing suspended material between the carrier arms and the material carrier supports upon operation of said drive means.

9. In a mechanism for transferring material, the combination of a pair of spaced material carriers each of which has supports for suspending material therefrom, a supported guideway interposed between said material carriers, a transfer carriage movably carried on said guideway between the material carriers, transfer drive means on said guideway for moving said transfer carriage laterally between said material carriers, a column carriage carried in said transfer carriage for movement therewith and having means for lateral movement in the transfer carriage, a column carrier including a vertically extended mainstay movably supported on said transfer carriage and in said column carriage, said column carriage having guide means for vertically guiding and stabilizing said column carrier therein, said mainstay having a laterally disposed cross member secured on the upper portion of said mainstay with a plurality of vertically extended carrier arms supported intermediate the ends of the cross member, each of said carrier arms being positionable adjacent a material carrier support by said transfer carriage and operative to have material suspended therefrom, eccentric drive means operatively connected to said column carrier, said eccentric drive means being operative to simultaneously impart a horizontal and vertical motion to the column carrier in a vertical plane such that the guiding column carriage is reciprocated in the transfer carriage and the carrier arms are moved in a circular path about said material carrier supports, said carrier arms being moved into the plane of the material carrier supports during the circular motion for transposing suspended material between the carrier arms and the material carrier supports, and means responsive to a transposition of material between said carrier arms and a material support for energizing said transfer drive means for moving the carrier arms into juxtaposed relation to the supports of other of said spaced material carriers.

10. In a mechanism for transferring material, the combination of a pair of spaced material carriers each of which has supports for suspending material therefrom, a guideway interposed between said material carriers, a transfer carriage carried on said guideway and adapted to move thereon between the material carriers, reversible carriage drive means operatively connected to said transfer carriage for moving the same between said material carriers, a column carriage on said transfer carriage for movement therewith and having means for providing lateral movement in the transfer carriage, a column carrier including a vertically extended mainstay movably supported on said transfer carriage and in said column carriage, said column carriage having guide means for vertically guiding and stabilizing said column carrier therein, said mainstay including a laterally disposed cross-member rigidly supported on the upper portion of said mainstay with a plurality of vertically extended carrier arms rigidly supported intermediate the ends of the cross-member, each of said carrier arms having enlarged end portions disposed normal to the carrier arms and positionable adjacent a material carrier support by said transfer carriage, said carrier arm being operative to have material suspended therefrom, eccentric carrier drive means including a crank-arm operatively connected to said column carrier for simultaneously imparting a horizontal and vertical motion to the column carrier driving said column carrier in a circular path such that the drive means serves to reciprocate the guiding column carriage in the transfer carriage and drive the carrier arms in a circular path about said material carrier supports, said carrier arms being moved into the plane of the material carrier supports for transposing suspended material between the carrier arms and the material carrier supports, first limit means actuated by said crank-arm after completion of transposing operation for stopping the carrier drive means and energizing said carriage drive means for moving the transfer carriage from a first of said material carrier support to a second material carrier support, second limit means actuated by said transfer carriage for stopping the operation of the transfer carriage drive means whenever a carrier arm is positioned adjacent said second material carrier support, and third limit means operative to energize said carrier drive means in a reverse direction for driving said carrier arm in a reversed movement for transposing suspended material between the carrier arm to said second material carrier support.

11. In a mechanism as defined in claim 7 but further characterized by stop means positioned on said mainstay opposite to said end portions, said stop means having inclined end abutments for receiving the lower end of suspended material whereby the material is retained in a normal vertical position during movement of the transfer carriage.

12. In a mechanism for transferring material, the combination of a pair of spaced material carriers each of which have supports for suspending material therefrom, a guideway interposed between said material carriers, a transfer carriage carried on said guideway, means on said guideway including carriage drive means for moving said transfer carriage between the material carriers, a column carriage carried in said transfer carriage for movement therewith and having means for lateral movement in the transfer carriage, a column carrier vertically extended above said column carriage and supported on said transfer carriage and in said column carriage, said column carriage having guide means for vertically guiding and stabilizing said column carrier therein, said column carrier including a plurality of vertically extended carrier arms each of which are positionable adjacent a material carrier support by said transfer carriage and operative to have material suspended therefrom, eccentric carrier drive means drivingly connected to said column carrier, said eccentric drive means being operative to simultaneously impart a horizontal and vertical motion to said column carrier for moving the carrier arms into the plane of the material carrier support and thus receiving suspended material from material carrying supports of a first of said material carriers, first limit means actuated in response to the completion of said material transposition to the carrier arms for energizing the carriage drive means and stopping the carrier drive means whereby the transfer carriage is moved on the guideway, second limit means actuated by said transfer carriage for de-energizing said carriage drive means and energizing said carrier drive means whenever said carrier arms are positioned adjacent supports of a second material carrier, said carrier drive means being energized in a reverse direction, by said second limit means whereby material suspended on the carrier arms is moved in a reversed directional path and into the plane of the second material carrier supports for depositing the suspended material on the second material carrier support, third limit means and said first limit means being actuated upon completion of the second material transposition for stopping the column carrier drive means and energizing said carriage drive means in a reverse direction such that the transfer carriage is returned to the first material carrier, and means for stopping the transfer carriage at that point.

References Cited in the file of this patent

UNITED STATES PATENTS

| | | |
|---|---|---|
| 2,074,809 | Rose | Mar. 23, 1937 |
| 2,153,071 | Bishop | Apr. 4, 1939 |
| 2,336,614 | Jackson | Dec. 14, 1943 |
| 2,628,702 | Mobrey | Feb. 17, 1953 |